(12) United States Patent
Halstead et al.

(10) Patent No.: US 12,580,829 B2
(45) Date of Patent: Mar. 17, 2026

(54) SERVICE ORCHESTRATION IN A COMMUNICATION INFRASTRUCTURE WITH DIFFERENT NETWORK DOMAINS

(71) Applicant: Hewlett Packard Enterprise Development LP, Spring, TX (US)

(72) Inventors: Philip Martin Halstead, Winnersh (GB); Claus Henrik Pedersen, Venon (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 354 days.

(21) Appl. No.: 18/329,053

(22) Filed: Jun. 5, 2023

(65) Prior Publication Data

US 2024/0291728 A1 Aug. 29, 2024

(30) Foreign Application Priority Data

Feb. 24, 2023 (EP) ..................................... 23305251

(51) Int. Cl.
| | |
|---|---|
| *H04L 41/40* | (2022.01) |
| *G06F 8/61* | (2018.01) |
| *H04L 41/022* | (2022.01) |
| *H04L 45/52* | (2022.01) |
| *H04L 45/741* | (2022.01) |

(Continued)

(52) U.S. Cl.
CPC ................ *H04L 41/40* (2022.05); *G06F 8/61* (2013.01); *H04L 41/022* (2013.01); *H04L 45/52* (2013.01); *H04L 45/741* (2013.01); *H04L 67/10* (2013.01); *H04W 28/16* (2013.01)

(58) Field of Classification Search
None
See application file for complete search history.

(56) References Cited

U.S. PATENT DOCUMENTS

| | | |
|---|---|---|
| 11,095,559 B1 | 8/2021 | Garvia et al. |
| 2020/0042365 A1 | 2/2020 | Tanna et al. |

(Continued)

OTHER PUBLICATIONS

Akhavain et al., "SRv6 User Plane in Mobile Core A Smooth Migration of Mobile Core User Plane from GTP to SRv6", Nov. 2018, 8 pages.

(Continued)

*Primary Examiner* — June Sison
(74) *Attorney, Agent, or Firm* — Trop, Pruner & Hu, P.C.

(57) ABSTRACT

In some examples, as part of implementing a service on a communication infrastructure that includes multiple different types of network domains, a system creates a distributed cloud of network functions, where the network functions are executable in virtualized environments on the physical resources to perform respective tasks. The system establishes a connection between the network functions to provide the service as part of service orchestration in the communication infrastructure, the service including respective tasks of the network functions. Communication of data between the network functions includes translating, at an edge of the distributed cloud, domain-specific data packets according to protocols used in the multiple different types of network domains to domain-agnostic data packets comprising labels to support label-based forwarding of data packets between the network functions in the virtualized environments.

20 Claims, 4 Drawing Sheets

(51) Int. Cl.
      *H04L 67/10*      (2022.01)
      *H04W 28/16*      (2009.01)

(56)                     References Cited

U.S. PATENT DOCUMENTS

| | | | |
|---|---|---|---|
| 2020/0099610 A1 | 3/2020 | Heron et al. | |
| 2021/0132980 A1 | 5/2021 | Thakkar et al. | |
| 2023/0006889 A1* | 1/2023 | Thyagaturu ......... | H04L 41/5054 |
| 2023/0100276 A1* | 3/2023 | Basur Shankarappa ..................... | H04L 41/0895 718/1 |
| 2024/0235984 A1* | 7/2024 | Chunduri .............. | H04L 45/302 |
| 2025/0165355 A1* | 5/2025 | Mitkar ................ | G06F 11/1458 |
| 2025/0184265 A1* | 6/2025 | Bhangu ................... | H04L 41/20 |

OTHER PUBLICATIONS

Cisco, "5G Automation Architecture", White paper, 2020, 29 Pages.
Oracle, "Oracle(Registered)Communications Network Service Orchestration", Sep. 2016, 126 pages.

* cited by examiner

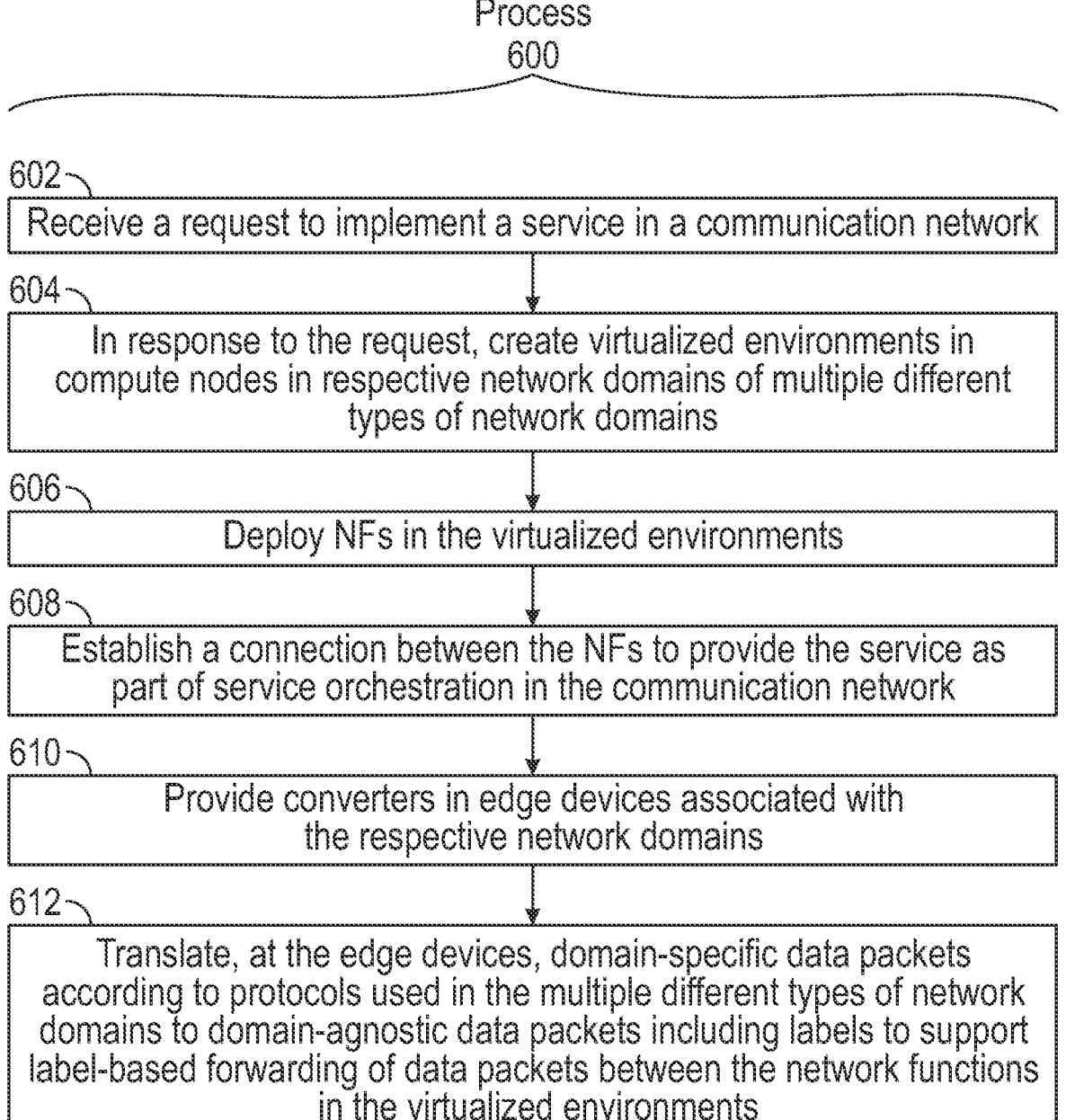

Process
600

602 — Receive a request to implement a service in a communication network

604 — In response to the request, create virtualized environments in compute nodes in respective network domains of multiple different types of network domains 606 — Deploy NFs in the virtualized environments 608 — Establish a connection between the NFs to provide the service as part of service orchestration in the communication network 610 — Provide converters in edge devices associated with the respective network domains 612 — Translate, at the edge devices, domain-specific data packets according to protocols used in the multiple different types of network domains to domain-agnostic data packets including labels to support label-based forwarding of data packets between the network functions in the virtualized environments

FIG. 6

SERVICE ORCHESTRATION IN A COMMUNICATION INFRASTRUCTURE WITH DIFFERENT NETWORK DOMAINS

BACKGROUND

Highly distributed communication networks such as those operated by telecommunication service providers can include multiple different types network domains, such as a wireless access network (e.g., a radio access network), a wired access network, backhaul and/or transport networks that interconnect access networks (e.g., wireless and/or wired access networks) to other infrastructure, the Internet, and a mobile core network that manages mobility services of mobile devices.

BRIEF DESCRIPTION OF THE DRAWINGS

Some implementations of the present disclosure are described with respect to the following figures.

FIG. 6 is a flow diagram of a process according to some examples.

Figure 1:
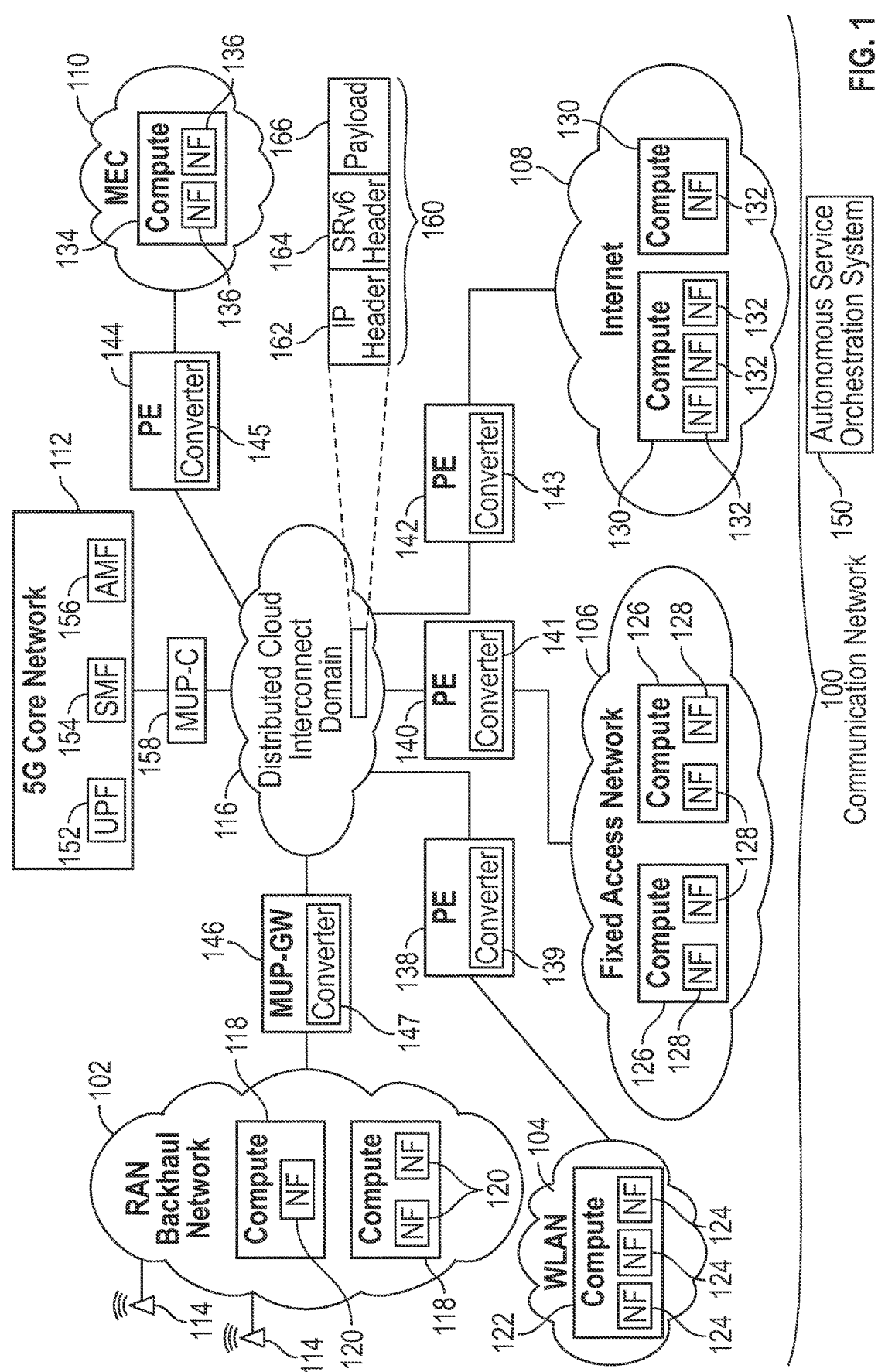
FIG. 1 is a block diagram of an arrangement that includes an autonomous service orchestration system and network functions (NFs) deployed on a physical communication infrastructure to provide a service, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Each network domain of a distributed communication network has its own protocol stack that operates according to a respective collection of protocols for transporting traffic of the network domain. As used here, a "collection" of items can refer to a single item or multiple items. Thus, a collection of protocols can refer to a single protocol or multiple protocols. A "network domain" can refer to an arrangement of resources that are to deliver a set of communication functionalities, such as to provide wireless communications, wired communications, and other functionalities. In some examples, each network domain may include a collection of data centers that execute network functions (NFs) to perform respective tasks of the network domain. NFs can refer to virtualized networking services running on open computing platforms, rather than proprietary, vendor-specific hardware.

Examples of protocols can include any or some combination of the following: a General Packet Radio Service (GPRS) Tunneling protocol (GTP) used in a radio access network (RAN), a Multi-Protocol Label Switching (MPLS) protocol used in a transport network, a Virtual Extensible Local Area Network (LAN) (VXLAN) protocol used in a data center, and so forth.

Further, each network domain has its own vendor-specific domain manager to perform domain management in the network domain. A "vendor-specific" domain manager can refer to a program provided by a specific vendor that developed the program, for example. Different network domains can employ domain managers from different vendors to perform domain management. Examples of different domain management performed in different network domains include any or some combination of the following: infrastructure management for management of resources in the network domain, such as processing resources, storage resources, and communication resources in a wireless access network, a wired access network, backhaul and/or transport networks that interconnect access networks to other infrastructure, the Internet, a mobile core network, etc.; assurance of physical and logical infrastructure in the network domain to ensure that the physical and logical infrastructure is operating according to target goals, as specified in service level agreements (SLAs) or other specifications; monitoring operations of a network domain; and so forth.

The domain managers in one network domain may not interact with domain managers in other network domains, resulting in a fragmented arrangement that makes it difficult to perform central orchestration to dynamically interconnect NFs of highly distributed communication networks. In some cases, NFs can be decomposed into cloud native workloads, which are workloads designed to run in a cloud environment. Decomposing an NF into cloud native workloads refers to implementing the NF with discrete cloud native workloads. The inclusion of cloud native workloads further exacerbates the issue of a heterogeneous, complex multi-domain networking environment.

Central orchestration in a networking environment with fragmented network domains for the purpose of deploying dynamic, potentially short-lived services can be challenging. A "service" refers to a collection of functionalities that are accessible by clients, which can refer to users, programs, or machines. Examples of functionalities include any or some combination of data storage, data manipulation, data analysis, data presentation, data communication, data streaming, and so forth.

A more specific example of a service that can be deployed is network slicing that can be provided in a fifth generation (5G) (or other type of) mobile communications network. Network slicing allows multiple networks to be created on top of a common physical infrastructure of the 5G mobile communications network. Other examples of services include streaming video on demand; a network edge service such as Multi-Access Edge Computing (MEC) in which enterprise-facing workloads are deployed at the edges of a communications network; Internet of Things (IoT) services such as for vehicle collision avoidance or for other purposes; remote drone operations; remote diagnosis for healthcare; distributed manufacturing; and so forth.

Deploying services in a heterogeneous, complex multi-domain networking environment can involve manual processes in which humans are involved in configuring the different network domains to implement different portions of a service to be deployed. The manual processes to configure different network domains would have to be re-iterated for each other service to be deployed. Such manual configuration processes are time consuming, error prone, and labor-intensive.

In accordance with some implementations of the present disclosure, service management in a heterogeneous, complex multi-domain networking environment is simplified by separating the management of physical communication infrastructure of the networking environment from end-to-end dynamic service orchestration. More specifically, an autonomous service orchestration system manages the deployment of virtualized NFs in a distributed cloud that is provided on top of the physical communication infrastructure. A "distributed cloud" refers to an arrangement of NFs that are interconnected together to provide a target service, such as 5G network slicing or another service. A "physical communication infrastructure" can refer to various resources that are provided to support communications between different entities. Resources of the physical communication infrastructure can include hardware resources such as network routing and switching resources, processing resources, communications resources, and storage resources. Resources of the physical communication infrastructure can also include program resources, such as operating systems (OSes), firmware programs, application programs, and so forth.

Deploying the distributed cloud "on top" of the physical communication infrastructure refers to deploying virtualized functionalities of the distributed cloud (including the NFs) using physical resources of the physical communication infrastructure, including compute resources, storage resources, and networking resources.

As part of implementing a service on the physical communication infrastructure, the autonomous service orchestration system creates a distributed cloud of NFs that are abstracted from the physical resources in the multiple different types of network domains. An NF is "abstracted" from the physical resources of the physical communication infrastructure if the NF does not have to be configured for a specific configuration (type, capability, etc.) of the physical resources to allow the NF to execute in the physical communication infrastructure. The abstraction can be achieved by executing the NFs in virtualized environments (e.g., containers, virtual machines (VMs), etc.) on the physical resources to perform respective tasks. A "virtualized environment" refers to an emulated computing environment that can share physical resources with other virtualized environments. A process executed in one virtualized environment can execute independently (and may be isolated) from a process executed in another virtualized environment.

Examples of NFs can include virtual network functions (VNFs) or cloud native network functions (CNFs). VNFs can be implemented in VMs, while CNFs can be implemented in containers.

FIG. 1 is a block diagram of an example arrangement that includes a number of network domains of a communication network 100. The network domains make up the physical communication infrastructure of the communication network 100.

The arrangement of FIG. 1 also includes an autonomous service orchestration system 150 that is able to implement services by deploying and interconnecting NFs in the network domains. The NFs are interconnected in a distributed cloud that is provided on top of the physical communication infrastructure to deploy a corresponding service.

In accordance with some implementations of the present disclosure, the service deployment provided by the autonomous service orchestration system 150 is separated from domain management performed in respective network domains of the communication network 100. In this way, when deploying services, the autonomous service orchestration system 150 does not have to configure physical resources of multiple types of different domains. The autonomous service orchestration system 150 can be implemented using a computer or multiple computers. The autonomous service orchestration system 150 provides dynamic orchestration of services in the communication network 100 that includes heterogeneous network domains of different types. The orchestration of services is dynamic in the sense that the autonomous service orchestration system 150 is able to deploy services on demand by requesters (users, programs, or machines), and further, the autonomous service orchestration system 150 is able to modify the services upon request and/or tear down the services once use of the services is completed.

The network domains include a RAN backhaul network 102, a wireless local area network (WLAN) 104 (also referred to as a Wi-Fi network), a fixed access network 106, a public network such as the Internet 108, a Multi-Access Edge Computing (MEC) domain 110, and a 5G core network 112. Although specific network domains are shown in FIG. 1, it is noted that in other examples, different network domains can be included in a communication network.

The RAN backhaul network 102 is used to interconnect RAN base stations 114 to other entities of the communications network 100. Each RAN base station provides a wireless coverage area in a cellular network. Wireless devices in the wireless coverage area of a RAN base station can wirelessly connect to the RAN base station.

The WLAN 104 includes access points (APs) to which wireless devices can wirelessly connect to communicate over the WLAN 104. The fixed access network 106 includes a wired network with connection points (e.g., ports) to which electronic devices can connect for communicating over the fixed access network 106. The Internet 108 is a public network over which electronic devices can communicate with one another and with other endpoints. The MEC 110 can offer various types of services at the edge of the communications network, such as video-on-demand services or other services. The 5G core network 112 manages the establishment of 5G communications sessions, which can be established across multiple network domains.

In accordance with some implementations of the present disclosure, NFs can be executed in respective network domains, including the RAN backhaul network 102, the WLAN 104, the fixed access network 106, the Internet 108, the MEC 110, and the 5G core network 112.

The NFs are interconnected by a distributed cloud interconnect domain 116 that interconnects the NFs in the network domains using a unifying protocol.

The distributed cloud interconnect domain 116 includes collection of nodes (including routers, switches, etc.) that can route data packets and perform other data processing in the distributed cloud interconnect domain 116 according to the unifying protocol.

In some examples, the unifying protocol of the distributed cloud interconnect domain 116 is the Segment Routing over IPv6 (SRv6) protocol. A version of SRv6 is described in Request for Comments (RFC) 8986, entitled "Segment Routing over IPv6 (SRv6) Network Programming," dated February 2021. Although a specific version SRv6 is noted, in other examples, a different version of SRv6 can be employed.

SRv6 implements segment routing over the IPv6 (Internet Protocol version 6) data plane. With segment routing, a source node (which transmits a packet) can choose a path or route and encodes the chosen path or route in a packet header as an ordered list of instructions, which are also referred to as "segments." The distributed cloud interconnect domain 116 can include nodes that are able to process the instructions in the packet header. An ingress node that receives a packet steers the packet through an ordered list of instructions (segments) in the packet header. Each instruction represents a function to be called at a specific location in a network. A function may range from simply moving forward in the segment list to any complex user-defined behavior. Network programming combines segment routing functions to achieve a networking objective that goes beyond mere packet routing.

SRv6 uses an IPv6 address as the label for packet forwarding. A predefined group of IPv6 addresses can be used as labels for packet forwarding. SRv6 segments are included in an IPv6 extension header that is part of a header in a packet, without changing the IPv6 encapsulation structure, which allows compatibility with an existing IPv6 network. The extension header that includes SRv6 segments can be referred to as an "SRv6 header" of a packet. A data packet that contains an SRv6 header can be referred to as an "SRv6 packet." An example SRv6 packet 160 is shown in FIG. 1. The SRv6 packet 160 includes an IP header 162, an SRv6 header 164, and a payload 166.

In examples where SRv6 is used in the distributed cloud interconnect domain 116, SRv6-based container networking is provided to interconnect NFs in containers. A common data plane (e.g., the distributed cloud interconnect domain 116 that implements SRv6) can be used for various different services that can be deployed on the physical communication infrastructure of the communication network 100.

In other examples, the distributed cloud interconnect domain 116 can employ other types of protocols that apply label-based packet forwarding. Label-based packet forwarding is distinguished from packet routing that uses network addresses, such as IP addresses. Routing based on network addresses relies on routing table lookups that can be time-consuming. Label-based packet forwarding allows packets to be forwarded along paths or routes that are defined based on labels. Lookups of forwarding tables using labels can be more efficient than lookups of routing tables.

In the example of FIG. 1, the RAN backhaul network 102 includes compute nodes 118 that execute respective NFs 120, the WLAN 104 includes a compute node 122 that executes respective NFs 124, the fixed access network 106 includes compute nodes 126 that execute respective NFs 128, the Internet 108 includes compute nodes 130 that execute NFs 132, and the MEC 110 includes a compute node 134 that execute NFs 136. A "compute node" can refer to a computer or multiple computers.

The 5G core network 112 includes the following network functions: a user plane function (UPF) 152, a session management function (SMF) 154, and an access and mobility management function (AMF) 156, which can be executed on a collection of compute nodes of the 5G core network 112.

Although specific quantities of compute nodes and NFs are depicted in FIG. 1 in the respective network domains, in other examples, different quantities of compute nodes and/or different quantities of NFs can be included in the respective network domains.

In some examples, provider edge (PE) nodes are provided between various network domains and the distributed cloud interconnect domain 116. More specifically, a PE node 138 is provided between the WLAN 104 and the distributed cloud interconnect domain 116, a PE node 140 is provided between the fixed access network 106 and the distributed cloud interconnect domain 116, a PE node 142 is provided between the Internet 108 and the distributed cloud interconnect domain 116, and a PE node 144 is provided between the MEC domain 110 and the distributed cloud interconnect domain 116. Each PE node can be implemented with a computer or multiple computers. In some examples, a PE node can be integrated with a compute node that executes an NF.

Each PE node includes a converter that translates between domain-specific data packets according to protocols used in the multiple different types of network domains and domain-agnostic data packets that includes labels to support label-based forwarding of data packets between NFs through the distributed cloud interconnect domain 116. For example, the PE node 138 includes a converter 139 to translate between domain-specific data packets according to protocols used in the WLAN 104 and domain-agnostic data (e.g., in the form of SRv6 packets) communicated through the distributed cloud interconnect domain 116, the PE node 140 includes a converter 141 to translate between domain-specific data packets according to protocols used in the fixed access network and domain-agnostic data communicated through the distributed cloud interconnect domain 116, the PE node 142 includes a converter 143 to translate between domain-specific data packets according to protocols used in the Internet 108 and domain-agnostic data communicated through the distributed cloud interconnect domain 116, and the PE node 144 includes a converter 145 to translate between domain-specific data packets according to protocols used in the MEC 110 and domain-agnostic data communicated through the distributed cloud interconnect domain 116.

In some examples, the conversion performed by each converter 139, 141, 143, or 145 can include encapsulating outbound data to be sent from a network domain to the distributed cloud interconnect domain 116 in a packet that includes an SRv6 header, or decapsulating inbound data received from the distributed cloud interconnect domain 116 to remove the SRv6 header. In other examples, other types of conversions can be performed of data packets between each network domain and the distributed cloud interconnect domain 116.

In some examples, a PE node between the RAN backhaul network 102 and the distributed cloud interconnect domain 116 is in the form of a mobile user plane gateway (MUP-GW) 146, which includes a converter 147 to translate between the domain-specific data packets of the RAN backhaul network 102 and the domain-agnostic data packets that are routed through the distributed cloud interconnect domain 116. More specifically, in some examples, for RANs that operate according to 5G standards defined by the Third Generation Partnership Project (3GPP), the RAN backhaul network 102 may employ the General Packet Radio Service (GPRS) Tunneling Protocol (GTP) to communicate data packets to a core network, such as the 5G core network 112. The converter 147 in the MUP-GW 146 can translate between GTP data packets and SRv6 packets, for example. In some examples, the converter 147 when sending outbound data packets from the RAN backhaul network 102 to the distributed cloud interconnect domain 116 can strip out a GTP header from each data packet and replaced with SRv6 header information. For inbound data packets from the distributed cloud interconnect domain 116 to the RAN backhaul network 102, the converter 147 can strip out SRv6 header information from the inbound data packets and add GTP headers to the inbound data packets.

More generally, communication of data between the NFs in respective virtualized environments (e.g., containers, VMs, etc.) on compute nodes of network domains involves translating, at an edge of the distributed cloud, domain-specific data packets according to protocols used in the multiple different types of network domains to domain-agnostic data packets routed through the distributed cloud interconnect domain 116.

The 5G core network 112 also includes various NFs, including the UPF 152 (user plane function), the SMF 154 (session management function), and the AMF 156 (access and mobility management function). The SMF 154 and AMF 156 are control plane functions for establishing sessions for 5G communications. The AMF 156 handles connection and mobility management tasks including establishing connections with mobile devices and managing mobility of electronic devices as they move within or between network domains. The SMF 154 creates, updates, and removes Protocol Data Unit (PDU) sessions and manages session context with the UPF 152. The UPF 152 is part of the 5G data plane and handles packet routing and forwarding, packet inspection, quality of service (QOS) management, and so forth. Data packets can be received and transmitted through the distributed cloud interconnect domain 116 by the UPF 152 with other NFs in the various network domains (102, 104, 106, 108, and 110).

Although reference is made to specific components of the 5G core network 112, it is noted that in other examples, other types of core networks can include other types of functions.

A mobile user plane controller (MUP-C) 158 is provided between the 5G core network 112 and the distributed cloud interconnect domain 116. The MUP-C 158 transforms between 5G sessions and IP routes. The MUP-C 158 can control the various PE nodes 138, 140, 142, and 144 and the MUP-GW 146 to route data packets based on routes established by the MUP-C 158. In some examples, the MUP-C 158 can translate 5G sessions to Border Gateway Protocol (BGP) routes. In some examples, the SRv6-based distributed cloud interconnect domain 116 can employ BGP as the network signaling protocol. Thus, in some examples, control messages of the SMF 154 and the AMF 156 are translated by the MUP-C 158 to BGP messages that are provided to respective network domains (102, 104, 106, 108, and/or 110).

The collection of the distributed cloud interconnect domain 116, the NFs in the various network domains, the various translation entities including the PE nodes (138, 140, 142, and 144) and the MUP-GW 146, the 5G core network 112, and the MUP-C 158 make up a distributed cloud in which the autonomous service orchestration system 150 can deploy services.

As noted above, to provision a given service on the physical communication infrastructure, the autonomous service orchestration system 150 can deploy NFs in compute nodes of various network domains, and establish a connection between the NFs as part of service orchestration in the communication infrastructure. Techniques or mechanisms according to some implementations of the present disclosure simplify service orchestration based on use of consistent interfaces across the physical resources of the networking environment. In some examples, to deploy services, the autonomous service orchestration system 150 can use application programming interfaces (APIs) provided by Kubernetes as examples of the consistent interfaces to set up NFs and to interconnect the NFs. Kubernetes refers to an open-source system for automating deployment and management of containerized applications. The containerized applications (which include the NFs of FIG. 1) can be run in containers deployed across multiple hosts, where a "host"

can refer to a compute resource (e.g., a collection of computers, a collection of processors, a collection of virtual machines (VMs), etc.).

Figure 2:
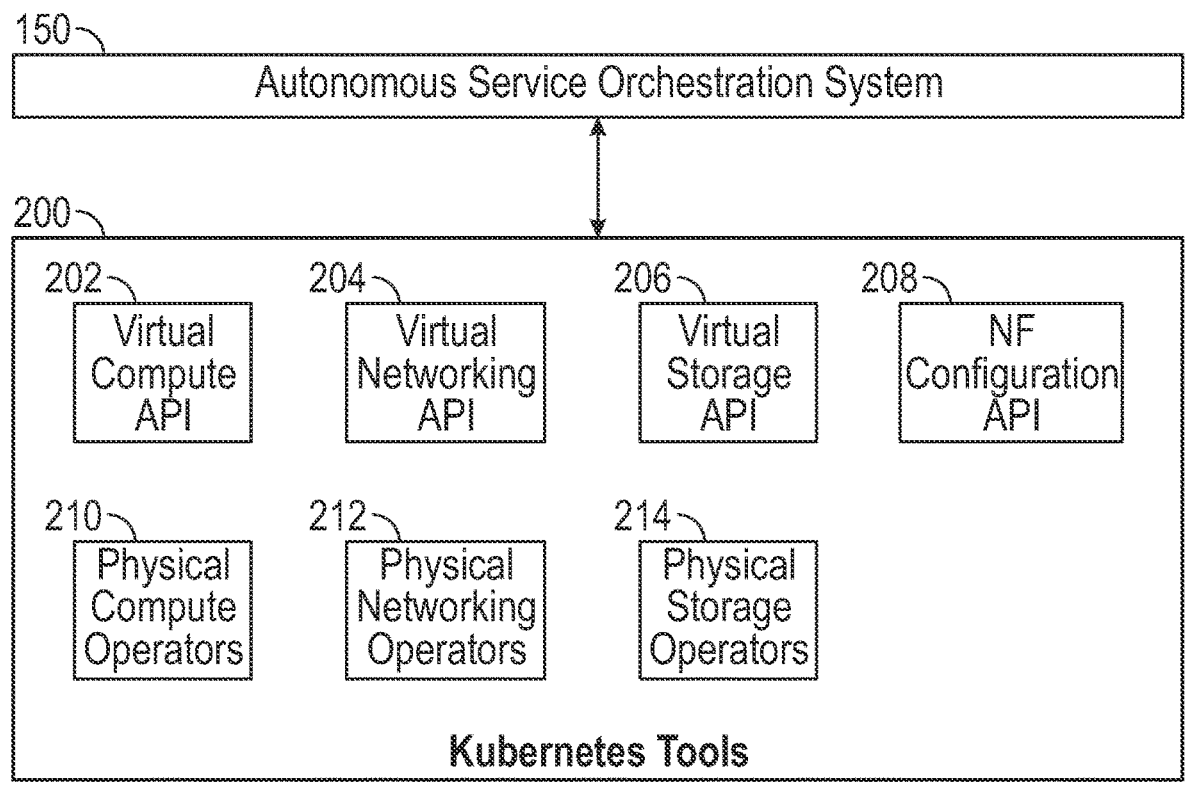
FIG. 2 is a block diagram of tools useable by the autonomous service orchestration system according to some examples.

In some examples, as shown in FIG. 2, the autonomous service orchestration system 150 can use various Kubernetes tools 200 as shown in FIG. 2 to set up services. The Kubernetes tools 200 include Kubernetes APIs, which include a virtual compute API 202 that can be used to set up a virtual compute function, such as NFs for deploying a service according to some examples of the present disclosure. Another Kubernetes API is a virtual networking API 204 that can be used to interconnect NFs. A further Kubernetes API is a virtual storage API 206 that can be used to set up storage for NFs.

Additionally, a further Kubernetes API is an NF configuration API 208 that can be used to configure NFs. Examples of NF configurations that can be performed using the NF configuration API 208 include setting policy enforcement and QoS rules on an NF, configuring policies for content inspection in an NF that performs deep packet inspection (DPI), configuring security policies for an NF that performs application layer filtering, and so forth.

The various APIs 202, 204, 206, and 208 are accessible by the autonomous service orchestration system 150. For example, the autonomous service orchestration system 150 can call routines included in the APIs 202, 204, 206, and 208 to perform respective tasks, such as setting up an NF in a target network domain (any of network domains 102, 104, 106, 108, 110, and 112 in FIG. 1), set up an interconnection between NFs through the distributed cloud interconnect domain 116, set up storage for an NF, and configure an NF.

In some examples, the Kubernetes tools 200 also include Kubernetes operators to manage physical resources of the physical communication infrastructure of the communication network 100. A Kubernetes operator is an application-specific controller that extends the functionality of a Kubernetes API to create, configure, and manage instances of resources on behalf of a Kubernetes user. For example, the Kubernetes operators include physical compute operators 210 that can be used to manage physical compute resources (e.g., compute nodes, processors, etc.) of the physical communication infrastructure, physical networking operators 212 that can be used to manage physical networking resources (e.g., switches, routers, etc.) of the physical communication infrastructure, and physical storage operators 214 that can be used to manage physical storage resources of the physical communication infrastructure. Examples of management of physical resources can include setting a boot path and Basic Input/Output System (BIOS) settings of compute nodes (such as those executing NFs) using a physical compute operator 210, configuring virtual local area networks (VLANs) on Ethernet switch ports using a physical networking operator 212, and configuring storage arrays (e.g., Redundant Array of Independent Disks or RAID arrays) on storage resources using the a physical storage operator 214, and so forth.

In other examples, other types of operators can be used to configure physical resources, such as operators provided by Redfish. The Redfish standard is a suite of specifications that provides a RESTful interface for management of servers, storage, networking, and other infrastructure.

By separating the autonomous service orchestration system 150 from the physical communication infrastructure (where domain management can be performed in respective network domains of the physical communication infrastructure), deployment of services on the physical communication infrastructure would not have to involve configuring physical resources of the physical communication infrastructure, such as Ethernet switches or routers, gateways, APs, base stations, data centers, and so forth.

Paths between NFs can be set up by the autonomous service orchestration system 150 in a dynamic way. As a service is deployed, the autonomous service orchestration system 150 can dynamically establish specific paths between NFs in specific network domains for providing the service. As services are updated, paths between NFs can be modified, new NFs may be created, existing NFs may be removed, and so forth.

The centralized orchestration of services in the physical communication infrastructure can be made independent of the physical communication infrastructure. In addition, the autonomous service orchestration system 150 can provide continuous integration (CI)/continuous delivery (CD) lifecycle management of services in the communication network 100. CI/CD refers to a process of developing new program code and committing the program code into production. CI/CD can be part of DevOps, which represents a program development process that speeds up the delivery of programs by automating and integrating development in production operations teams.

In some examples, the autonomous service orchestration system 150 can create containers in which NFs are to be deployed, and then can configure NFs that are executed in the containers. For example, the autonomous service orchestration system 150 can use the virtual compute API 202 to set up a container on a compute node, and can use the NF configuration API 208 to configure an NF that is to be executed in the container. Once multiple NFs are created in respective containers, the virtual networking API 204 can be used to set up a path between the NFs.

Figure 3:
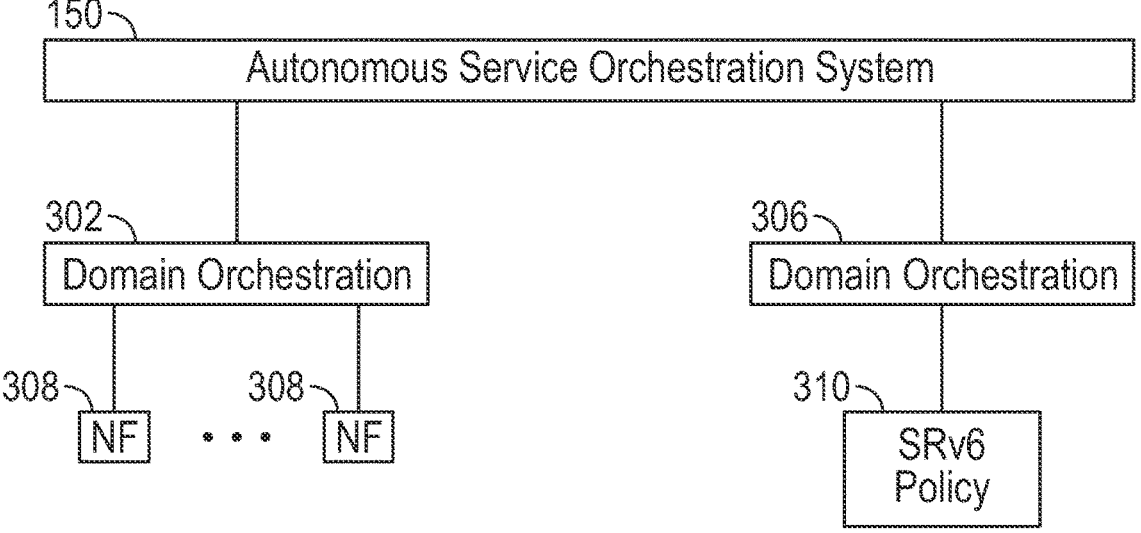
FIG. 3 is a block diagram of domain orchestrations that can be performed by the autonomous service orchestration system according to some examples.

FIG. 3 shows an example of orchestrations for implementing a service, where the orchestrations can be performed by the autonomous service orchestration system 150. The autonomous service orchestration system 150 can perform domain orchestration 302 with respect to NFs 308 in respective network domains (e.g., the various NFs depicted in FIG. 1). The domain orchestration 302 involves lifecycle management of the NFs 308, including deploying an NF including creating a container, configuring an NF, monitoring an NF, tearing down an NF. Additionally, the domain orchestration 302 can include preparing the physical infrastructure in the various network domains to support the NFs 308, such as setting server boot paths, installing OSes, and so forth.

The autonomous service orchestration system 150 can also perform domain orchestration 306 with respect to an SRv6 policy 310. The SRv6 policy 310 is provided for a service to be implemented by the autonomous service orchestration system 150. The SRv6 policy 310 can specify how the NFs 308 are to be interconnected. The domain orchestration 306 includes the autonomous service orchestration system 150 using the SRv6 policy 310 to interconnect the NFs 308. The SRv6 policy 310 is implemented using SRv6 segments (instructions) in data packets to programmatically control the forwarding of the data packets and other functions to be performed with respect to the data packets. The SRv6 policy 310 specifies a source-routed path from a source router (in the distributed cloud interconnect domain 116) to an endpoint router (in the distributed cloud interconnect domain 116). Routers steer data packets along the source-routed path.

For example, an SRv6 policy can configure a path that fits a series of NFs in a chain, which in combination forms a service exposed to a consumer (a user, a program, or a machine). SRv6 policies can also specify path resiliency (to steer data packets around sections of the distributed cloud interconnect domain 116 that may be down), QoS (to ensure that a service meets target performance goals), and so forth.

The autonomous service orchestration system 150 can also perform service assurance based on the SRv6 policy 310. The autonomous service orchestration system 150 can monitor SRv6 traffic (including data packets) for path availability and performance, such as bandwidth, latency, jitter, and so forth.

In an example, the autonomous service orchestration system 150 can deploy 5G network slicing (which is an example of a service that can be provided in the communication network 100 of FIG. 1) in response to a request including input requirements for deploying the 5G network slicing. The request can be submitted by a consumer. As an example, the input requirements can include Ultra-Reliable Low Latency Communications (URLLC) requirements that govern security, latency, and reliability of data communications. URLLC can employ network slicing to allocate network resources and optimize traffic communications. Each network slice in a 5G communication network can have associated security, latency, and reliability requirements.

In response to the input requirements, the autonomous service orchestration system 150 can determine if a network slice already exists that meets the input requirements. If not, the autonomous service orchestration system 150 can install NFs in corresponding network domains to implement a new network slice. As each NF is installed, the NF is advertised to other installed NFs of the new network slice. The autonomous service orchestration system 150 can then apply an SRv6 policy (e.g., 310 in FIG. 3) to interconnect the NFs for the new network slice.

In some implementations of the present disclosure, the NFs that can be deployed using physical resources of different network domains effectively provide composable data centers (in the form of compute nodes that execute the NFs). Available tools such as Kubernetes APIs and operators (or other tools whether open-source or proprietary) can be used to deploy services. Physical resources (including hardware and program resources) are abstracted and exposed to the autonomous service orchestration system 150. Networking within and across the composable data centers is based on a unifying protocol such as SRv6. SRv6-based networking is extended to the containers or other virtualized environments in which NFs are executed, which simplifies the interconnection of NFs as existing transport networks and associated protocols do not have to be modified or replaced. An example of a transport network is an IPv4 Multi-Protocol Label Switching (MPLS) transport network. Packet forwarding between composable data centers is transparent to existing transport networks so that the same transport networks can be employed for multiple different services (i.e., a different configuration of the transport networks does not have to be applied on a per service basis). As NFs are installed, network reachability to them is quickly made visible to all other NFs within or across all composable data centers that make up a distributed cloud to provide a target service. Also, if a service is to be modified or a new service is to be deployed, the existing data centers and transport networks in network domains do not have to be modified or torn down.

Figure 4:
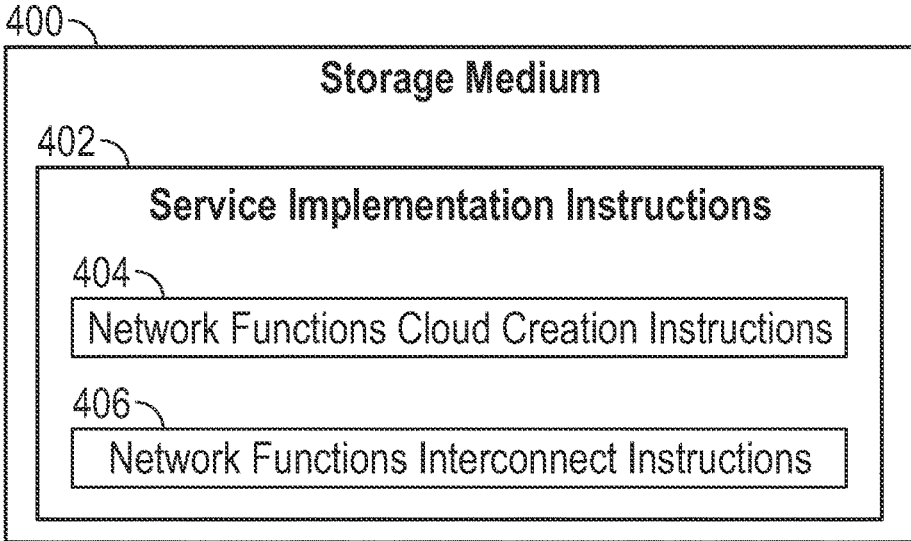
FIG. 4 is a block diagram of a storage medium storing machine-readable instructions according to some examples.

FIG. 4 is a block diagram of a non-transitory machine-readable or computer-readable storage medium 400 storing machine-readable instructions for service orchestration in a communication infrastructure that has physical resources. The machine-readable instructions can be part of the autonomous service orchestration system 150 of FIG. 1, for example. The machine-readable instructions upon execution cause a system to perform various tasks.

The machine-readable instructions include service implementation instructions 402 to implement a service on the communication infrastructure that includes multiple different types of network domains. As part of implementing the service on the communication infrastructure, the service implementation instructions 402 include network functions cloud creation instructions 404 and network functions interconnect instructions 406.

The network functions cloud creation instructions 404 create a distributed cloud of NFs that are abstracted from the physical resources in the multiple different types of network domains. The NFs are executable in virtualized environments on the physical resources to perform respective tasks. The virtualized environments can include containers or VMs, for example.

The network functions interconnect instructions 406 establish a connection between the NFs to provide the service as part of service orchestration in the communication infrastructure. The service includes the respective tasks of the NFs. Communication of data between the NFs includes translating, at an edge of the distributed cloud, domain-specific data packets according to protocols used in the multiple different types of network domains to domain-agnostic data packets comprising labels to support label-based forwarding of data packets between the network functions in the virtualized environments. The edge of the distributed cloud can include provider edge devices, such as the PE nodes 138, 140, 142, and 110, the MUP-GW 146, and the MUP-C 158 of FIG. 1.

In some examples, the distributed cloud couple the multiple different types of network domains to a core network of a cellular communication system. In some examples, the domain-agnostic data packets include SRv6 header information including the labels used for label-based forwarding of data packets. In specific examples, the labels are selected from a predefined collection of IPv6 addresses.

In some examples, the machine-readable instructions apply an SRv6 policy (e.g., 310 in FIG. 3) to interconnect the NFs. The machine-readable instructions can perform service assurance for the service based on the SRv6 policy.

In some examples, the multiple different types of network domains include different types of access networks, such as the wireless access networks, wired access networks, or the Internet. In some examples, the multiple different types of network domains include a backhaul network or a transport network.

In some examples, the multiple different types of network domains include an edge computing domain, such as the MEC 110 of FIG. 1.

In some examples, the machine-readable instructions receive a request to implement the service (e.g., 5G network slicing). In response to the request, the machine-readable instructions install the NFs on the physical resources in the multiple different types of network domains, and as each NF is installed, advertise the NF to any other installed NF for the service.

Figure 5:
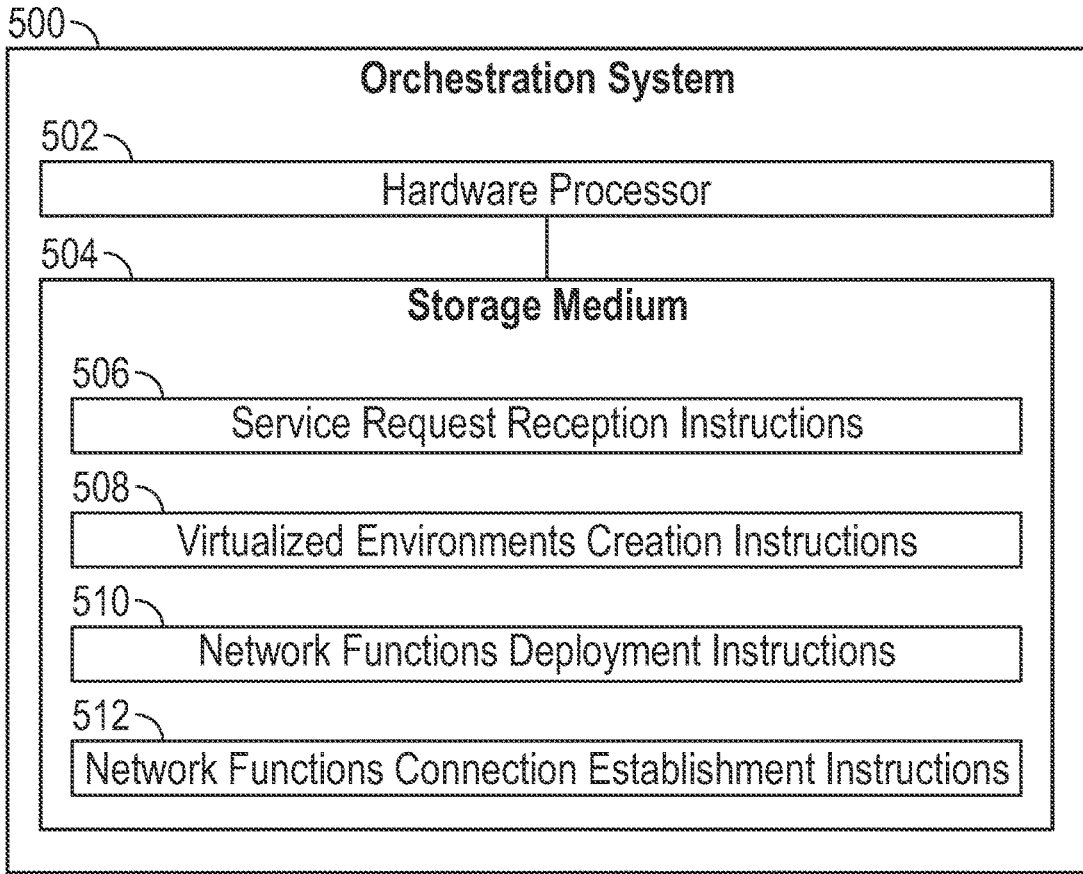
FIG. 5 is a block diagram of an orchestration system according to some examples.

FIG. 5 is a block diagram of an orchestration system 500 according to some examples of the present disclosure. An example of the orchestration system 500 can be the autonomous service orchestration system 150 of FIG. 1.

The orchestration system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The orchestration system 500 includes a storage medium 504 storing machine-readable instructions executable on the hardware processor 502 to perform various tasks. Machine-readable instructions executable on a hardware processor can refer to the machine-readable instructions executable on a single hardware processor or the instructions executable on multiple hardware processors.

The machine-readable instructions include service request reception instructions 506 to receive a request to implement a service in a communication network. In some examples, the request can be received from a consumer, such as a user, a program, or a machine.

The machine-readable instructions include virtualized environments creation instructions 508 to, in response to the request, create virtualized environments in compute nodes in respective network domains of multiple different types of network domains. For example, the virtualized environments can include containers or VMs. In some examples, to create containers, the virtualized environments creation instructions 508 can use a Kubernetes API, such as the virtual compute API 202 of FIG. 2.

The machine-readable instructions include network functions deployment instructions 510 to deploy NFs in the virtualized environments. In some examples, the network functions deployment instructions 510 can also use a Kubernetes API, such as the virtual compute API 202 of FIG. 2, to deploy the NFs.

The machine-readable instructions include network functions connection establishment instructions 512 to establish a connection between the NFs to provide the service as part of service orchestration in the communication network. The service includes respective tasks of the NFs. In some examples, the network functions establishment instructions 512 can use a Kubernetes API, such as the virtual networking API 204 of FIG. 2, to interconnect the NFs. Communication of data between the network functions includes translating, at edge devices of the respective network domains, domain-specific data packets according to protocols used in the multiple different types of network domains to domain-agnostic data packets comprising labels to support label-based forwarding of data packets between the network functions in the virtualized environments.

FIG. 6 is a flow diagram of a process 600, which can be performed by a system comprising a hardware processor. The system can include a single computer or multiple computers.

The process 600 includes receiving (at 602) a request to implement a service in a communication network. The request may be a request to implement a 5G network slice, for example, or another type of service.

The process 600 includes, in response to the request, creating (at 604) virtualized environments in compute nodes in respective network domains of multiple different types of network domains. In some examples, the network domains include an access network (e.g., a wireless or wired access network) and a mobile core network (e.g., a 5G core network). The network domains can also include other network domains.

The process 600 includes deploying (at 606) NFs in the virtualized environments. The process 600 further includes establishing (at 608) a connection between the NFs to provide the service as part of service orchestration in the communication network. The service to be deployed includes respective tasks of the NFs.

The process 600 includes providing (at 610) converters in edge devices associated with the respective network domains. The edge devices can include the PE nodes 138, 140, 142, and 144, the MUP-GW 146, and the MUP-C 158 of FIG. 1, for example.

The process 600 includes translating (at 612), at the edge devices, domain-specific data packets according to protocols used in the multiple different types of network domains to domain-agnostic data packets including labels to support label-based forwarding of data packets between the network functions in the virtualized environments.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising program instructions that upon execution by one or more hardware processors cause a system to:
    as part of implementing a service on a communication infrastructure that includes multiple different types of network domains comprising a first network domain and a second network domain:
        create a distributed cloud of network functions that are abstracted from physical resources in the multiple different types of network domains, wherein the network functions are executable in virtualized environments on the physical resources to perform respective tasks; and
        establish a connection between the network functions to provide the service as part of service orchestration in the communication infrastructure, the service comprising the respective tasks of the network functions; and
    communicate data between the network functions comprising translating, at an edge of the distributed cloud, domain-specific data packets according to protocols used in the multiple different types of network domains to domain-agnostic data packets comprising labels to support label-based forwarding of data packets between the network functions in the virtualized environments, the translating comprising:
        producing a first domain-agnostic data packet by encapsulating, at a first converter, a first domain-specific data packet received from the first network domain with a header containing a label for label-based forwarding of the first domain-agnostic data packet through an interconnect, and
        producing a second domain-agnostic data packet by removing, at a second converter, a tunneling protocol header from a second domain-specific data packet received from the second network domain, and replacing the tunneling protocol header with a header comprising a label for label-based forwarding of the second domain-agnostic data packet through the interconnect.

2. The non-transitory machine-readable storage medium of claim 1, wherein the edge of the distributed cloud comprises edge devices comprising converters including the first and second converters.

3. The non-transitory machine-readable storage medium of claim 1, wherein the domain-agnostic data packets comprise Segment Routing over Internet Protocol Version 6 (SRv6) header information including the labels.

4. The non-transitory machine-readable storage medium of claim 3, wherein the program instructions upon execution cause the system to:
    apply an SRv6 policy to interconnect the network functions.

5. The non-transitory machine-readable storage medium of claim 4, wherein the program instructions upon execution cause the system to:
    perform service assurance for the service based on the SRv6 policy.

6. The non-transitory machine-readable storage medium of claim 3, wherein the header comprising the label replacing the tunneling protocol header comprises an SRv6 header.

7. The non-transitory machine-readable storage medium of claim 1, wherein the multiple different types of network domains comprise different types of access networks.

8. The non-transitory machine-readable storage medium of claim 1, wherein the multiple different types of network domains comprise an edge computing domain.

9. The non-transitory machine-readable storage medium of claim 1, wherein the multiple different types of network domains comprise a backhaul network or a transport network.

10. The non-transitory machine-readable storage medium of claim 1, wherein the distributed cloud couple the multiple different types of network domains to a core network of a cellular communication system.

11. The non-transitory machine-readable storage medium of claim 1, wherein the program instructions upon execution cause the system to employ Kubernetes application programming interfaces (APIs) to set up the network functions in the virtualized environments, and to interconnect the network functions to implement the service.

12. The non-transitory machine-readable storage medium of claim 1, wherein the program instructions upon execution cause the system to employ Kubernetes operators to manage the physical resources to implement the service.

13. The non-transitory machine-readable storage medium of claim 1, wherein the program instructions upon execution cause the system to:

receive a request to implement the service;

in response to the request, install the network functions on the physical resources in the multiple different types of network domains; and as each network function is installed, advertise the network function to any other installed network function for the service.

14. A system comprising:

a hardware processor; and a non-transitory storage medium storing program instructions executable on the hardware processor to:

receive a request to implement a service in a communication network;

in response to the request, create virtualized environments in compute nodes in respective network domains of multiple different types of network domains comprising a first network domain and a second network domain;

deploy network functions in the virtualized environments;

establish a connection between the network functions to provide the service as part of service orchestration in the communication network, the service comprising respective tasks of the network functions; and communicate data between the network functions comprising translating, at edge devices of the respective network domains, domain-specific data packets according to protocols used in the multiple different types of network domains to domain-agnostic data packets comprising labels to support label-based forwarding of data packets between the network functions in the virtualized environments, the translating comprising:

producing a first domain-agnostic data packet by encapsulating, at a first edge device, a first domain-specific data packet received from the first network domain with a header containing a label for label-based forwarding of the first domain-agnostic data packet through an interconnect, and producing a second domain-agnostic data packet by removing, at a second edge device, a tunneling protocol header from a second domain-specific data packet received from the second network domain, and replacing the tunneling protocol header with a header comprising a label for label-based forwarding of the second domain-agnostic data packet.

15. The system of claim 14, wherein the domain-agnostic data packets comprise Segment Routing over Internet Protocol Version 6 (SRv6) header information including the labels.

16. The system of claim 15, wherein the program instructions are executable on the hardware processor to apply an SRv6 policy to interconnect the network functions.

17. The system of claim 16, wherein the program instructions are executable on the hardware processor to provide service assurance for the service based on the SRv6 policy.

18. The system of claim 14, wherein the program instructions are executable on the hardware processor to employ Kubernetes application programming interfaces (APIs) to set up the network functions in the virtualized environments, and to interconnect the network functions to implement the service.

19. A method of a system comprising a hardware processor, comprising:

receiving a request to implement a service in a communication network;

based on the request, creating virtualized environments in compute nodes in respective network domains of multiple different types of network domains comprising a first network domain and a second network domain;

deploying network functions in the virtualized environments;

establishing a connection between the network functions to provide the service as part of service orchestration in the communication network, the service comprising respective tasks of the network functions;

providing converters in edge devices associated with the respective network domains; and translating, at the edge devices, domain-specific data packets according to protocols used in the multiple different types of network domains to domain-agnostic data packets comprising labels to support label-based forwarding of data packets between the network functions in the virtualized environments, the translating comprising:

producing a first domain-agnostic data packet by encapsulating, at a first edge device, a first domain-specific data packet received from the first network domain of with a header containing a label for label-based forwarding of the first domain-agnostic data packet through an interconnect, and producing a second domain-agnostic data packet by removing, at a second edge device, a tunneling protocol header from a second domain-specific data packet received from the second network domain, and replacing the tunneling protocol header with a header comprising a label for label-based forwarding of the second domain-agnostic data packet.

20. The method of claim 19, wherein the domain-agnostic data packets are according to a Segment Routing over Internet Protocol Version 6 (SRv6) protocol, wherein the establishing of the connection provides SRv6 interconnectivity to the virtualized environments in which the network functions are deployed, and wherein the header comprising the label replacing the tunneling protocol header comprises an SRv6 header.

* * * * *